United States Patent
Provine et al.

(10) Patent No.: US 8,655,866 B1
(45) Date of Patent: Feb. 18, 2014

(54) RETURNING FACTUAL ANSWERS IN RESPONSE TO QUERIES

(75) Inventors: John R. Provine, New York, NY (US); Engin Cinar Sahin, New York, NY (US); Vinicius J. Fortuna, New York, NY (US); Andrew W. Hogue, Ho-Ho-Kus, NJ (US); Kevin Lerman, New York, NY (US); Daniel Loreto, New York, NY (US)

(73) Assignee: Google Inc., Mountain View, CA (US)

( * ) Notice: Subject to any disclaimer, the term of this patent is extended or adjusted under 35 U.S.C. 154(b) by 144 days.

(21) Appl. No.: 13/025,036

(22) Filed: Feb. 10, 2011

(51) Int. Cl.
  *G06F 17/30* (2006.01)
  *G06F 7/00* (2006.01)
(52) U.S. Cl.
  USPC ............... 707/713; 707/715; 706/14; 706/21
(58) Field of Classification Search
  None
  See application file for complete search history.

(56) References Cited

U.S. PATENT DOCUMENTS

| | | | |
|---|---|---|---|
| 7,567,976 B1 | 7/2009 | Betz et al. | |
| 7,587,387 B2 | 9/2009 | Hogue | |
| 7,769,579 B2 | 8/2010 | Zhao et al. | |
| 8,065,290 B2 | 11/2011 | Hogue | |
| 8,332,394 B2 * | 12/2012 | Fan et al. | 707/723 |
| 2004/0117352 A1 * | 6/2004 | Schabes et al. | 707/3 |
| 2009/0292687 A1 * | 11/2009 | Fan et al. | 707/5 |
| 2011/0047159 A1 * | 2/2011 | Baid et al. | 707/738 |
| 2011/0179012 A1 * | 7/2011 | Pedersen | 707/710 |

* cited by examiner

*Primary Examiner* — Angelica Ruiz
(74) *Attorney, Agent, or Firm* — Fish & Richardson P.C.

(57) ABSTRACT

Methods, systems, and apparatus, including computer programs encoded on a computer storage medium, for information retrieval. In one aspect, a method includes receiving a fact query; determining an expected type of answer to the fact query; identifying search results responsive to the fact query; identifying phrases from the resources corresponding to the search results that correspond to a form of the expected type; determining a score for each of the identified phrases; and presenting an answer to the fact query using the scores.

24 Claims, 5 Drawing Sheets

RETURNING FACTUAL ANSWERS IN RESPONSE TO QUERIES

BACKGROUND

This specification relates to information retrieval.

Internet search engines aim to identify resources (e.g., web pages, images, text documents, multimedia context) that are relevant to a user's needs and to present information about the resources in a manner that is most useful to the user. Internet search engines return one or more search results in response to a user submitted query.

SUMMARY

This specification describes technologies relating to information retrieval.

In general, one aspect of the subject matter described in this specification can be embodied in methods that include the actions of receiving a fact query; determining an expected type of answer to the fact query; identifying search results responsive to the fact query; identifying phrases from the resources corresponding to the search results that correspond to a form of the expected type; determining a score for each of the identified phrases; and presenting an answer to the fact query using the scores. Other embodiments of this aspect include corresponding systems, apparatus, and computer program products.

These and other embodiments can optionally include one or more of the following features. The answer is presented along with one or more search results responsive to the query. Identifying phrases includes searching indexed annotations of the search results. The annotations identify phrases associated with particular types. Determining a score for a phrase includes determining a frequency of the phrase occurring in the search results. The score for a phrase is based on a proximity of the phrase to the query terms in each corresponding resource. The score for a phrase is based on a score for each corresponding resource. The score for a phrase is based on a proximity of the phrase to other key terms in each corresponding resource.

In general, one aspect of the subject matter described in this specification can be embodied in methods that include the actions of indexing resources including identifying phrases associated with one or more types; and annotating the index of resources with one or more types and their respective identified phrases, where the annotation of a phrase is a canonical form of the phrase. Other embodiments of this aspect include corresponding systems, apparatus, and computer program products.

These and other embodiments can optionally include one or more of the following features. Each annotation includes a type and subtype associated with the annotated phrase. Each annotation includes an indicator of the number of tokens in the annotated phrase. Each annotation includes a location of the annotation within a specific group of phrase values.

Particular embodiments of the subject matter described in this specification can be implemented so as to realize one or more of the following advantages. An answer to a fact query can be determined with a high degree of accuracy given that the expected type of the answer is known. Thus, for any query that satisfies particular criteria (e.g., seeking an answer of a certain type) the system can accurately identify either an answer or indicate that there is no answer. Additionally, given a small space of answers for the queries, the system can easily aggregate the most frequency occurring answers in search results. By contrast, question answer system having a static set of facts may not be able to make this determination (e.g., when a query is outside the static set). Facts can be answered quickly, for example, on the order of the time taken by the search engine to identify the corresponding search results.

Additionally, the system can provide answers to an extended set of fact queries beyond those in a particular fact table providing query-answer mapping. In particular, answers can be identified for queries that have not been previously received using answers appearing in search results. Received queries do not require additional parsing beyond that performed by a search engine as long as a type of answer can be identified. For example, each of the following queries seeking a date of birth can be answered without further query parsing: [barack obama date of birth], [when was obama born], [obama date born], [barack obama born], [dob of barack obama], and [obama's date of birth]. By contrast, a static query-answer mapping is restricted to particular stored formulations of the query.

Facts are less likely to be out of date as long as search results are current. Additionally, changes can be quickly identified based on changes in search result occurrences. For example, a static table of facts assembled before an election can have an incorrect answer for the current governor of a state after the election. Possible answers are indexed as part of a search engine rather than maintained in a separate database of answers. Consequently, queries and facts are only associated at query time.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Search queries can be directed to particular facts. Fact queries include those that seek a short, universally accepted factual answer. For example, a query "when was Barack Obama born" is a factual query seeking a particular date (e.g., Aug. 4, 1961). Facts can be associated with a corresponding type or types. For example, the above query is associated with a "date" type. Types can also include subtypes, for example, "dates between 1945 and 1980."

When a factual query is identified, the associated type of the answer to the fact query is identified. Additionally, a search engine can identify search results responsive to the query. A system can identify phrases matching the identified type from one or more of the search results. In some implementations, the system identifies phrases directly from the corresponding resources of the search results. In some other implementations, an annotated index that has been annotated with phrases by type is used to identify the phrases. The system scores the identified phrases to determine a most likely answer to the factual query. This answer can be presented along with one or more of the received search results. For example, the answer to the factual query can be positioned at the top of the search results (e.g., as part of an answer box).

Figure 1:
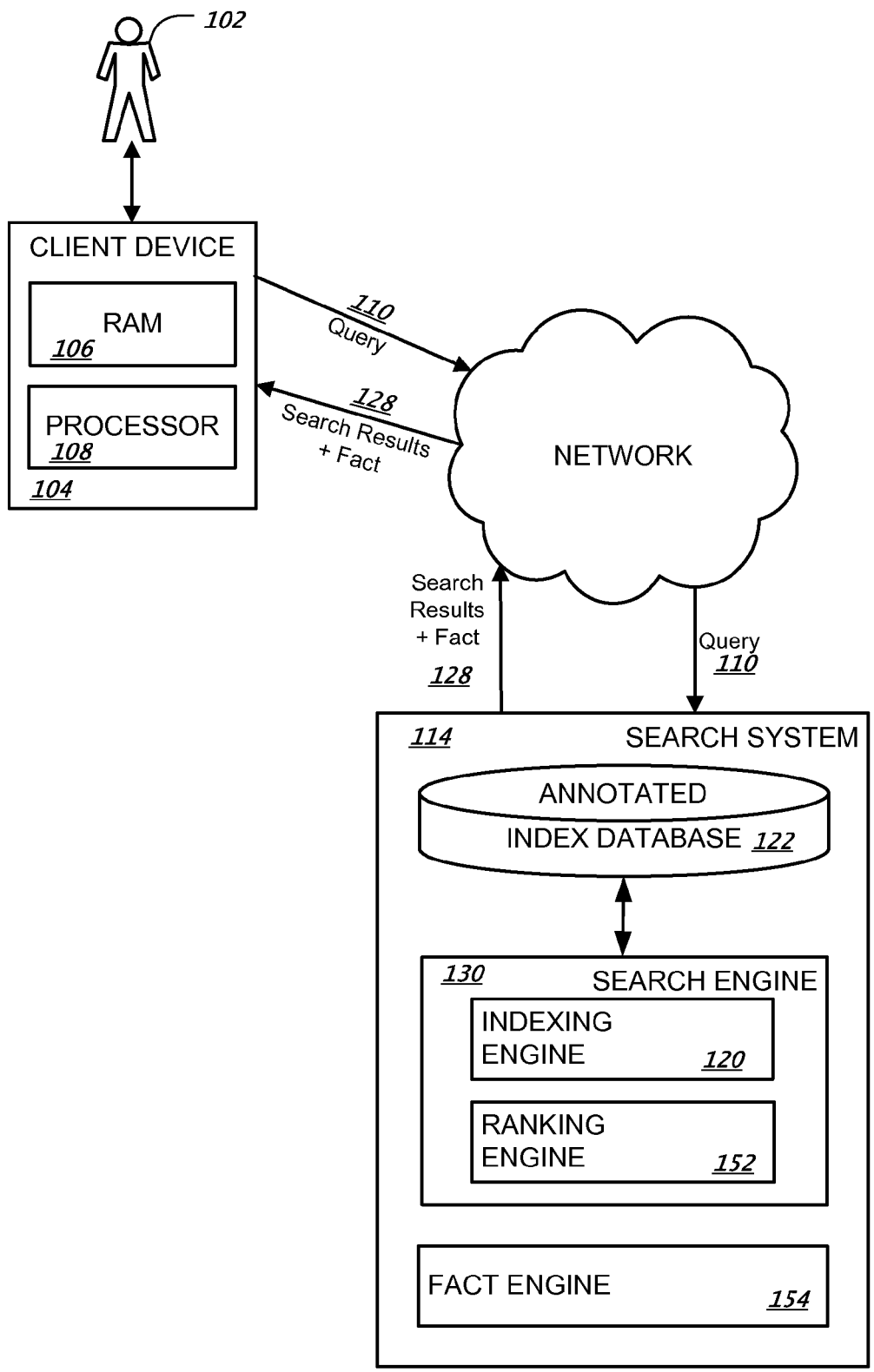
FIG. 1 shows an example search system.

FIG. 1 shows an example search system 114 for providing search results relevant to submitted queries as can be implemented in an internet, an intranet, or another client and server environment. The search system 114 is an example of an information retrieval system in which the systems, components, and techniques described below can be implemented.

A user 102 can interact with the search system 114 through a client device 104. For example, the client 104 can be a computer coupled to the search system 114 through a local area network (LAN) or wide area network (WAN), e.g., the Internet. In some implementations, the search system 114 and the client device 104 can be one machine. For example, a user can install a desktop search application on the client device 104. The client device 104 will generally include a random access memory (RAM) 106 and a processor 108.

A user 102 can submit a query 110 to a search engine 130 within a search system 114. When the user 102 submits a query 110, the query 110 is transmitted through a network to the search system 114. The search system 114 can be implemented as, for example, computer programs running on one or more computers in one or more locations that are coupled to each other through a network. The search system 114 includes an index database 122 and a search engine 130. The search system 114 responds to the query 110 by generating search results 128, which are transmitted through the network to the client device 104 in a form that can be presented to the user 102 (e.g., as a search results web page to be displayed in a web browser running on the client device 104).

When the query 110 is received by the search engine 130, the search engine 130 identifies resources that match the query 110. The search engine 130 will generally include an indexing engine 120 that indexes resources (e.g., web pages, images, or news articles on the Internet) found in a corpus (e.g., a collection or repository of content), an index database 122 that stores the index information, and a ranking engine 152 (or other software) to rank the resources that match the query 110. The indexing and ranking of the resources can be performed using conventional techniques. The index database 122 can be annotated with phrases and types identified within the corresponding indexed resources. Alternatively, a separate annotated index can be maintained within the search system 114 or in a separate location. The search engine 130 can transmit the search results 128 through the network to the client device 104 for presentation to the user 102.

A fact engine 152 determines whether the query 110 is a fact query and if so identifies the expected type of answer for the fact. The type is then used to identify phrases that match the type from search results using the index database 122.

Figure 2:
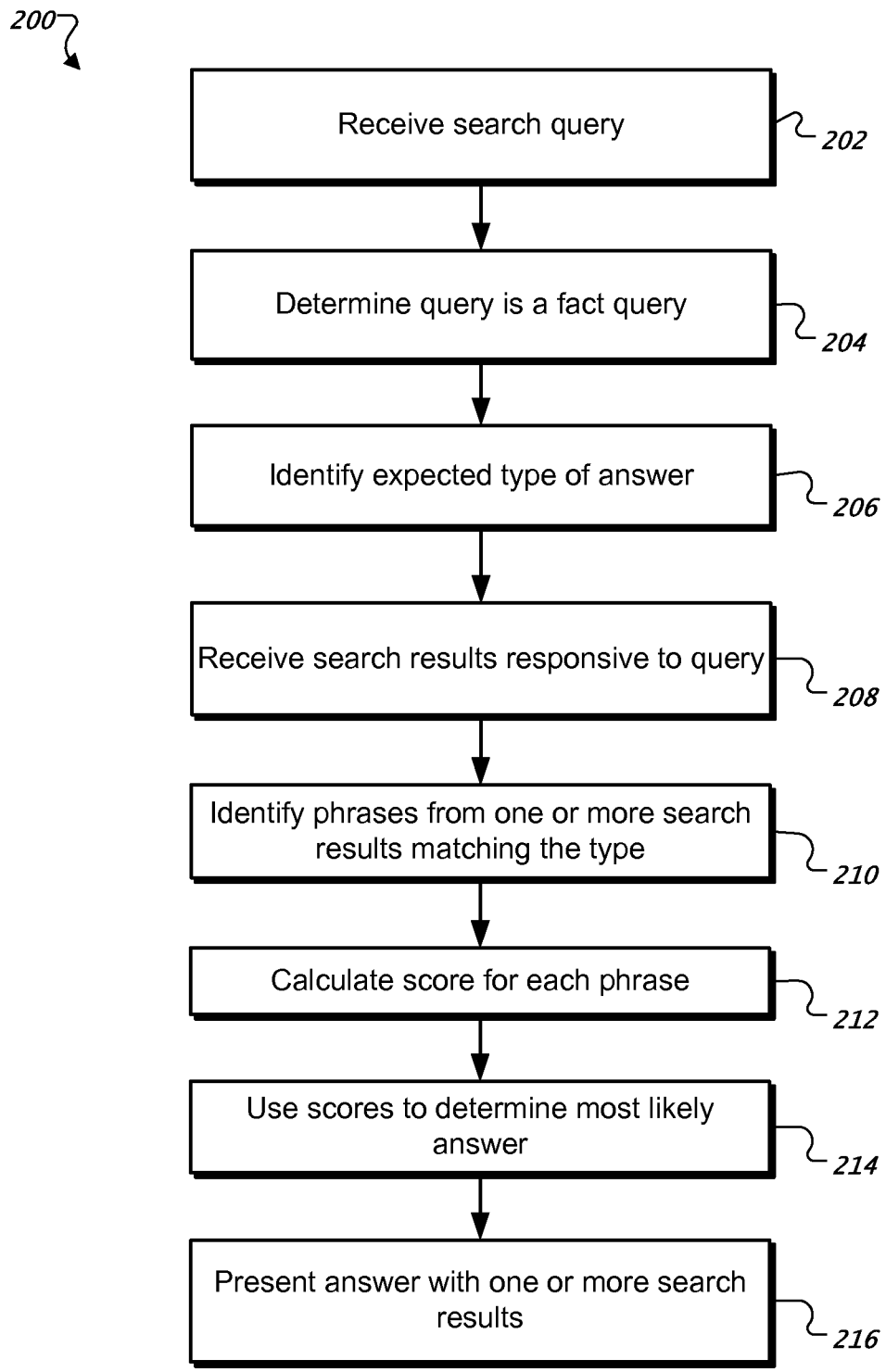
FIG. 2 is a flow diagram of an example process for responding to fact queries.

FIG. 2 is a flow diagram of an example process 200 for responding to fact queries. For convenience, the process 200 will be described with respect to a system, including one or more computing devices, that performs the process 200.

The system receives 202 a search query. The search query can be received, for example, from a search field of a search interface. For example, a search interface can have a particular page accessed by the user through a browser application. In some implementations, search queries can be received through other user input, for example, a search field in a browser toolbar rather than directly into a search interface. In some alternative implementations, the search query can be received through a question and answer interface (e.g., for a question and answer website or service) instead of a search interfaced.

The system determines 204 that the query is a fact query. If the query is not a fact query, then search results are identified and presented to the user. If the query is determined to be a fact query, than the system attempts to identify one or more answers to the query in addition to providing search results. A fact query typically expresses a question (e.g., "how tall is the Eiffel Tower") or has an implicit fact-finding interpretation (e.g., "president of ghana").

Fact queries are those that seek a short, universally accepted factual answer. Thus, the facts are not ambiguous and can be expressed in a work or short phrase. Examples of fact queries include "when was barack obama born," "what is the capital city of turkey," "distance in miles between london and paris," and "who was nominated for the best director academy award in 1969." Additionally, in some implementations, an accepted range of values can be used to answer fact queries (e.g., weight of sumo wrestlers is a range between 80 and 200 kilograms).

Examples of non-fact queries includes "when will the world end" (answer doesn't exist), and "how does [company X] make money" (answer too long and complex). Additionally, content may be commonly accepted but not represent facts, for example, it can be commonly accepted that pesto includes basil, but such a recipe for pesto is not a fact.

A query for a given fact can be phrased in various ways and still be used to identify answers. For example, data of birth queries can respond to queries in the form "X date of birth" where X is a person name as well as identifying who was born on an exact date query.

To determine whether or not a query is fact seeking, various techniques can be used. In some implementations, a fact identifying system identifies a set of expressions that are very likely to be fact queries (e.g. queries containing strong fact-seeking phrases like "date of birth" or "on what date," queries beginning with a who/what/where/when/how term, questions posted on a Q&A site).

In some other implementations, facts can be extracted using various fact patterns applied to a collection of documents (e.g., web documents). For example, patterns can include "the X of Y is Z" (e.g., "birthday of George Washington is February 22"), or "Z being the cell in row X and column Y" for table information. Using the patterns, the fact identifying system can identify attributes having numerous associated facts. For example, the attribute "date of birth" will have a large number of date extractions, but "blind date" will have very few extractions. Thus, whether or not a query includes an attribute associated with a lot of facts can be used as a heuristic to identify a query as being fact-seeking.

Additionally, the fact identifying system can examine a distribution of answers returned by the system. For example, for the fact query [barack obama date of birth], the answer "Aug. 4, 1961" will be far more common than any other date. If instead the input query is [barack obama date], there will be a much noisier distribution of dates (e.g., for different events—election, inauguration, state of the union, birth), and no one date will have enough support to be the answer. Because of this, the particular query can be determined not to be a fact query since no particular fact answers the query.

The system identifies 206 one or more expected types of the answer to the fact query. A type refers to a pattern or a collection of phrases that includes the correct answer to the query. Examples of types include measurements, dates, names of people, and geographic locations. Other types can be more specific, for example, "names of comedians" or "MPAA ratings." Types can include a collection of categories. Categories can be derived, for example, from a mapping of categories to particular strings. Additionally, types can have one or more subtypes. For example, a measurement type can also include speed, distance, and height as subtypes. Subtypes can also include, for example, ranges of values (e.g., distances between 4 and 7 feet) or particular aspects of values (e.g., number-as-integer or number-as-float).

In some implementations, the system identifies types by sending the fact query to a typing system that returns one or more types for the query. In some other implementations, the system receives a pre-computed collection of types associated with particular forms of fact queries (e.g., expected types for particular fact queries). The query can be compared with the collection of types to identify types associated with a particular form of fact query. For example, keywords or phrases in a query can be compared with keywords associated with particular types.

The system receives 208 search results responsive to the query. In particular, for a query Q, m top search results $R_1$, $R_2$, ..., $R_m$ are returned. The number of ranked results m returned for Q can be specified for the system (e.g., top 1000 results). The search results can be identified using various techniques for identifying a particular result as responsive to the query terms, for example, as described above with respect to FIG. 1.

The system identifies 210 phrases from one or more of the search results matching the type. Thus, for each search result $R_j$, all unique phrases $P_{j1}, P_{j2}, \ldots, P_{jp}$ are found within $R_j$ that match the type $T_i$.

In some implementations, the resources identified by the search results are searched for phrases having the form associated with a particular identified type. For example, for the query "barack obama date of birth" the system can find all phrases in the top m search results that are in the specified forms for a date type. For example, all phrases in the form mm/dd/yy for month, date, and year respectively, that appear in the resource (e.g., in the HTML of a particular result web page).

In some other implementations, an index, which can be the same as the search index, is annotated to identify types and all phrases matching that type for indexed resources. The annotations can be pre-computed for the collection of types. An example process of annotating an index is described below with respect to FIG. 5. Thus, instead of searching the resources themselves, the annotated index is searched for annotated phrases for the specified type among the indexed entries for the identified top m search results.

The system calculates 212 a score for each identified phrase. In some implementations, the score for a phrase can simply be a count of the number of search results that a given phrase appears in. For example, each search result of the top 1000 search results responsive to the query "barack obama date of birth" and including the phrase "Aug. 4, 1961" can be counted. In some implementations, phrases for all forms of the type are counted together. Thus, "Aug. 4, 1961" would also be identified and added to the count. The different phrase forms can be converted into a canonical form so that the count reflects the number of times phrases corresponding to the canonical form occur. In some implementations, only a single phrase per resource is counted even if the phrase occurs multiple times.

Phrase scores can be further calculated or weighted based on other factors. In some implementations, the score for a phrase is calculated per result and then an overall score for the phrase is calculated as an aggregate of these scores across all search results including the phrase. For example, for a given search result $R_k$ having the phrase $P_k$, a score $S_k$ is assigned to the phrase. Then, a sum of all scores is calculated for the phrase $P_k$ for all results $R_j$ having the phrase $P_k$.

The score of a phrase in a particular result can also be a function of one or more parameters. For example, a score for a phrase can be calculated or weighted based on a score for the page, a proximity of query terms to the phrase in the result, or a proximity of other key terms to the phrase. For example, a higher rated resource (e.g., a web page given a high score by the search engine) can be used to calculate a higher score for the phrase as an indication that a higher rated resource is more likely to have a correct answer.

Similarly, if the query terms are found in close proximity to the phrase, the phrase can be scored more highly because it is more likely tied to the query rather than just having a matching phrase at some random location within a document. For example, if the query is "when was barack obama born" and one of the search results is a resource listing the birthdates for every U.S. president, a number of phrases matching the type will be found (e.g., one for each president). However, the phrase for Barack Obama is likely to be close to the corresponding date phrase "Aug. 4, 1961" and thus should be weighted or scored higher than the other phrases in the resource (e.g., higher than the phrase "Feb. 22, 1732" corresponding to the birth date of George Washington, which may also be in the same resource).

In another example, for particular types, key contextual terms can be identified. Thus, for a query "how tall is yao ming" the term "height" can be considered a key contextual term even though it does not appear in the query. Thus, the presence of the term "height" in a resource near a matching phrase can indicate a higher likelihood that the phrase is the answer to the query.

The system uses the scores to determine 214 a most likely answer to the fact query. For example, the most likely answer can be the phrase, or canonical form of one or more phrases, that occurred most often in the search results (e.g., a phrase having a highest count). In some other implementations, a minimum threshold count is required in order to establish a phrase as a most likely answer. In some other implementations, the highest aggregate score is used to determine a phrase as the most likely answer.

The system presents 216 the answer along with one or more of the search results. For example, the answer can be positioned at the top of the search results. Additionally, the answer can be set apart from the search results to indicate that it is distinct from the search results.

In some implementations, the answer is presented within a particular structure, for example an answer box module. Answer box modules display specially formatted information when triggered in response to particular types of queries (e.g., a fact query). This particular structure can be used to present the answer to the fact query at a top of a group of search results.

Figure 3:
FIG. 3 illustrates example results to a fact query.

FIG. 3 illustrates example results to a fact query. In particular, FIG. 3 shows an example user interface 300 for presenting search results including an answer to a fact query. As shown in the example user interface 300, search results 306 are presented in response to a query "when was barack obama born" shown in a search field 302. Each of the search results 306 identify resources responsive to the query. Above the search results 306 an answer portion 304 is presented. The answer portion includes the answer itself 312, in this example, "Barack Obama Born—Aug. 4, 1961." Additionally, the answer portion 304 includes references to the sources of the answer 308 and a feedback link 310.

The references to the sources of the answer 308 identify the corresponding resources from which the answer was obtained. Thus, for example, the validity of the provided answer can be assessed by the user based on a confidence in the sources. In some implementations, a "show sources" option is selectable by the user to display references (e.g., links) to one or more sources used to identify the answer. For example, the answer portion can expand to provide inline links and associated snippets to one or more resources.

The feedback link 310 allows users to provide feedback associated with the provided answer. For example, the feedback link 310, when selected, allows the user to response to a particular question, for example, "is this accurate" with "yes" and "no" options for selection. In some alternative implementations, selecting the feedback link allows the user to enter a text narrative into a text field. In some other implementations, the selection triggers an email message in which the user can provide feedback on the answer.

Figure 4:
FIG. 4 illustrates example results to a fact query.

FIG. 4 illustrates example results to a fact query. In particular, FIG. 4 shows an example user interface 400 for presenting search results including an answer to a received fact query. As shown in the example user interface 400, search results 406 are presented in response to a query "height of empire state building" shown in a search field 402. Each of the search results 406 identify resources responsive to the query. Above the search results 406 an answer portion 404 is presented. The answer portion includes the answer itself in this example, "Empire State Building Height—1,250 feet." Additionally, the answer portion 404 includes references to the sources of the answer and a feedback link as described above with respect to FIG. 3.

In some implementations, multiple answers can be provided. This can be the case when there are multiple correct answers to a query or when there is a debate as to the correct answer. For example, a query of "what is the capital of South Africa" can result in multiple high scoring answers being listed. For example, the answer can include "Cape Town" "Pretoria" and "Bloemfontein." Each of the answers can be listed in a ranked ordering, e.g., according to a score above some specified threshold value.

Figure 5:
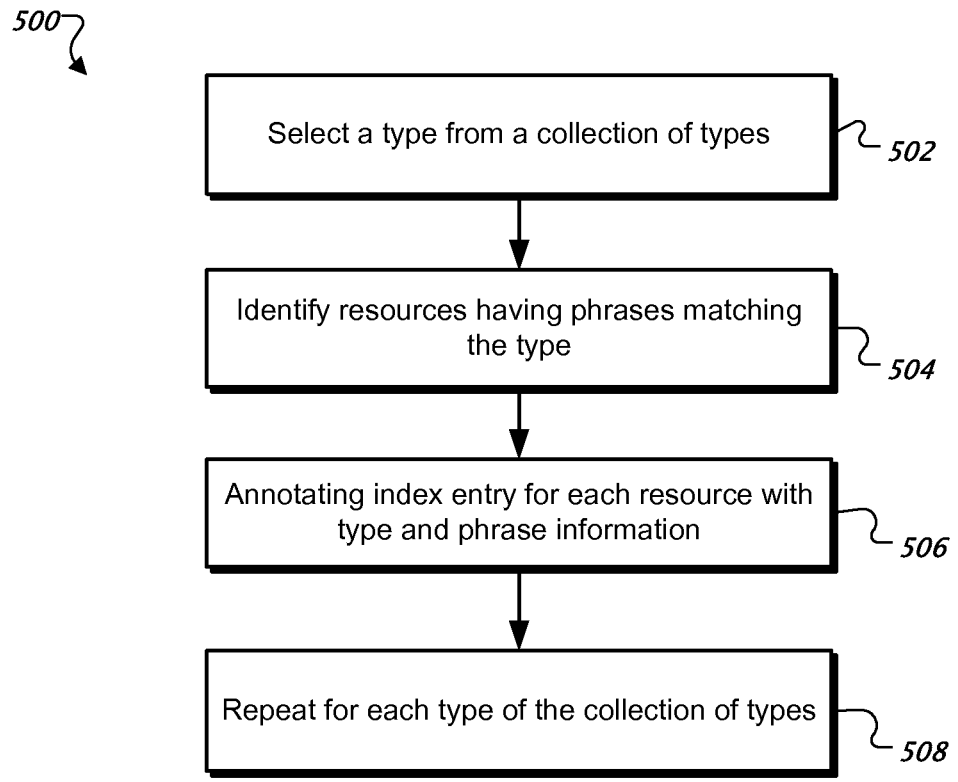
FIG. 5 is a flow diagram of an example process for annotating an index.

FIG. 5 is a flow diagram of an example process 500 for annotating an index. For convenience, the process 500 will be described with respect to a system, including one or more computing devices, that performs the process 500.

The system selects a type 502 from a collection of types. For example, a collection of types can be received or generated where each type is associated with an expected form of answer to a particular fact query.

The system identifies 504 resources having one or more phrases of the selected type. In some implementations, a collection of resources is crawled to identify phrases in the form of the expected answer of the selected type. If the type is a date type, the resources are searched to identify phrases having one or more date formats, e.g., "mm/dd/yy" or "month day year." Thus, phrases "Aug. 4, 1961" and "Aug. 4, 1961" will both be identified as phrases of the date type.

The system annotates 506 an index entry for each resource. Thus, for each phrase detected to have the type, an index term will be associated with it that represents the phrase. As a result, when searching for phrases of a given type, the index can be searched to quickly identify phrases. A particular phrase annotation can be associated with several pieces of annotation information. Specifically, an aggregation indexing term, a length of the annotation, and/or a canonical value can be stored.

The aggregation indexing term indicates the type or subtype of the phrase. This is used to identify all phrases matching the particular type or subtype. For example, if the annotation is for the phrase "12 inches" the aggregation indexing term can be "meas;length" indicating that the annotation is of a length subtype of a measurement (meas) type.

The length of the annotation indicates the number of tokens in the annotation (e.g., how many words) following the first token. This can be used when highlighting the annotation in a result (e.g., in a snippet form the resource) or when calculating the distance from the phrase to other content (e.g., to query terms) when scoring phrases. In the example above of an annotation "12 inches," the length is "1" because there is one token "inches" following the first token "12".

The canonical value of the phrase allows different acceptable forms of the phrase for a given type to be aggregated into a single common value. In some implementations, this also includes converting to common units. For example, the phrase "12 inches" can be converted to meters and represented only as a number "0.3048." In another example, the dates Aug. 4, 1961 and Aug. 4, 1961 can both be represented in canonical form as "19610408."

In some implementations, the indexing term is a more specific precise indexing term. This can be used to more specifically categorize different annotation values for searching by identifying a grouping of values in which the annotation is located. For example, the phrase "12 inches" can have the precise indexing term as "meas;1;23_23". This indicates that the phrase is a length measurement with a canonical value in value bucket number 23. The buckets can be specified to have particular ranges of values that can be defined tightly or broadly. Thus, all length measurements having the value of 12 inches can be found in the same value bucket, speeding the search of the index.

In some implementations, constraints are specified to limit the size of the index. For example, a limit can be set on how many instances of a same phrase from a single resource or avoid duplicate annotations altogether.

The system repeats 508 the process each type in the collection of types. In some implementations, the process can be periodically run as resources are updated or as additional types or subtypes are added to the collection.

When a fact query is received, the system can structure a query for searching the index annotations. For example, the index query can have a type that includes the gm;[type];[subtype] form for the identified type associated with the received fact query. For example, the query can identify all resources matching the query "prius fuel efficiency" and additionally highlight all token sequences which have the appropriate type, for example, type and subtype: [measurement];[fuel efficiency].

In addition, in some implementations additional restrictions are included that specify how close the answer phrases should be to particular content in the resources (e.g., particular terms).

In some implementations, rather than simply highlighting all the tokens of a particular type, the system identifies all the occurrences of the desired type in the top 10 documents and aggregates these together based on their canonical value. For example, on the query [who was the second president of the united states] the following name annotations can be identified:

60 John Adams
30 George Washington
20 Thomas Jefferson
10 James Madison

Thus, in some implementations, multiple possible answers can be presented and ranked based on the number of occurrences, or the number of occurrences can be used to identify the most likely answer, which is presented (e.g., John Adams) along with one or more next highest occurring answers. In some implementations, the occurrences of answers across multiple pages can also be used by the system for internal debugging, for example, a mean attribute distance can be calculated as the average number of tokens from the query attribute to the answer's value across all occurrences of the value. A smaller value can indicate the answer is more likely to be correct.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving a fact query;
   determining an expected type of answer to the fact query, wherein a type refers to a pattern or a collection of phrases that includes a correct answer to the fact query;
   identifying one or more search results responsive to the fact query;
   identifying, from respective resources corresponding to the one or more search results, a first collection of phrases that match a form of the expected type;
   determining, from the first collection of phrases, a second collection of phrases, the second collection of phrases each corresponding to a canonical form of the expected type;
   determining, for each canonical phrase in the second collection of phrases, a respective score based on a count of resources corresponding to the one or more search results that include the canonical phrase or a phrase corresponding to the canonical phrase;
   identifying a particular phrase in the second collection of phrases as an answer to the fact query based on a score of the particular phrase; and
   providing the answer to the fact query.

2. The method of claim 1, where the answer is presented along with one or more search results responsive to the query.

3. The method of claim 1, where identifying phrases includes searching indexed annotations of the search results.

4. The method of claim 3, where the annotations identify phrases associated with particular types.

5. The method of claim 1, where determining a score for a phrase includes determining a frequency of the phrase occurring in the search results.

6. The method of claim 1, where the score for a phrase is based on a proximity of the phrase to the query terms in each corresponding resource.

7. The method of claim 1, where the score for a phrase is based on a score for each corresponding resource.

8. The method of claim 1, where the score for a phrase is based on a proximity of the phrase to other key terms in each corresponding resource.

9. A system comprising:
   one or more data processing apparatus operable to perform operations comprising:
      receiving a fact query;
      determining an expected type of answer to the fact query, wherein a type refers to a pattern or a collection of phrases that includes a correct answer to the fact query;
      identifying one or more search results responsive to the fact query;
      identifying, from respective resources corresponding to the one or more search results, a first collection of phrases that match a form of the expected type;
      determining, from the first collection of phrases, a second collection of phrases, the second collection of phrases each corresponding to a canonical form of the expected type;
      determining, for each canonical phrase in the second collection of phrases, a respective score based on a count of resources corresponding to the one or more search results that include the canonical phrase or a phrase corresponding to the canonical phrase;
      identifying a particular phrase in the second collection of phrases as an answer to the fact query based on a score of the particular phrase; and
      providing the answer to the fact query.

10. The system of claim 9, where the answer is presented along with one or more search results responsive to the query.

11. The system of claim 9, where identifying phrases includes searching indexed annotations of the search results.

12. The system of claim 11, where the annotations identify phrases associated with particular types.

13. The system of claim 9, where determining a score for a phrase includes determining a frequency of the phrase occurring in the search results.

14. The system of claim 9, where the score for a phrase is based on a proximity of the phrase to the query terms in each corresponding resource.

15. The system of claim 9, where the score for a phrase is based on a score for each corresponding resource.

16. The system of claim 9, where the score for a phrase is based on a proximity of the phrase to other key terms in each corresponding resource.

17. A non-transitory computer storage medium encoded with a computer program, the program comprising instructions that are executed by data processing apparatus to cause the data processing apparatus to perform operations comprising:
receiving a fact query;
determining an expected type of answer to the fact query, wherein a type refers to a pattern or a collection of phrases that includes a correct answer to the fact query;
identifying one or more search results responsive to the fact query;
identifying, from respective resources corresponding to the one or more search results, a first collection of phrases that match a form of the expected type;
determining, from the first collection of phrases, a second collection of phrases, the second collection of phrases each corresponding to a canonical form of the expected type;
determining, for each canonical phrase in the second collection of phrases, a respective score based on a count of resources corresponding to the one or more search results that include the canonical phrase or a phrase corresponding to the canonical phrase;
identifying a particular phrase in the second collection of phrases as an answer to the fact query based on a score of the particular phrase; and
providing the answer to the fact query.

18. The computer storage medium of claim 17, where the answer is presented along with one or more search results responsive to the query.

19. The computer storage medium of claim 17, where identifying phrases includes searching indexed annotations of the search results.

20. The computer storage medium of claim 19, where the annotations identify phrases associated with particular types.

21. The computer storage medium of claim 17, where determining a score for a phrase includes determining a frequency of the phrase occurring in the search results.

22. The computer storage medium of claim 17, where the score for a phrase is based on a proximity of the phrase to the query terms in each corresponding resource.

23. The computer storage medium of claim 17, where the score for a phrase is based on a score for each corresponding resource.

24. The computer storage medium of claim 17, where the score for a phrase is based on a proximity of the phrase to other key terms in each corresponding resource.

* * * * *